United States Patent [19]
Melamed et al.

[11] 3,858,056
[45] Dec. 31, 1974

[54] MEANS AND METHOD FOR STABILIZED OPTIMIZED TEMPERATURE PHASE MATCHED OPTICAL PARAMETRIC GENERATION

[75] Inventors: Nathan T. Melamed, Pittsburgh; John D. Feichtner, Murrysville, both of Pa.

[73] Assignee: Westinghouse Electric Corporation, Pittsburgh, Pa.

[22] Filed: Jan. 22, 1974

[21] Appl. No.: 435,548

[52] U.S. Cl. ............ 307/88.3, 331/94.5 S, 250/552, 250/206, 330/4.5
[51] Int. Cl............................................. H01s 3/00
[58] Field of Search.................... 250/238, 206, 552; 219/210; 307/88.3; 331/94.5 S, 94.5 N, 94.5 F, 94.5 V; 330/4.5

[56] References Cited
UNITED STATES PATENTS

| | | |
|---|---|---|
| 3,328,723 | 6/1967 | Giordmaine et al............. 330/4.5 X |
| 3,541,300 | 11/1970 | Stadnik et al................... 331/94.5 S |
| 3,617,918 | 11/1971 | Rabin............................. 307/88.3 X |
| 3,628,173 | 12/1971 | Danielmeyer................... 331/94.5 S |

*Primary Examiner*—Walter Stolwein
*Attorney, Agent, or Firm*—R. M. Trepp

[57] ABSTRACT

A means and method for automatically adjusting the temperature of a non-linear crystal used in the generation of optical parametric beams regardless of changes in any other parameters of the system including laser mode structure and thermal lensing, laser power absorption in the crystal or crystal laser alignment. The invention provides for continuously measuring the intensity of at least a portion of the parametric output beam during first and second periods of time $\tau/2$ and comparing the measured output intensity between said first and second periods and adjusting the temperature of the non-linear crystal proportionally to any difference in the measured intensity.

10 Claims, 2 Drawing Figures

PATENTED DEC 31 1974 3,858,056

MEANS AND METHOD FOR STABILIZED OPTIMIZED TEMPERATURE PHASE MATCHED OPTICAL PARAMETRIC GENERATION

FIELD OF THE INVENTION

The present invention relates to a means and method for stabilizing and optimizing phase-matched optical parametric beams, and, in particular, to continually adjusting the temperature of the non-linear crystal in response to variations in the intensity of the parametric output beam.

BACKGROUND OF THE INVENTION

The generation of harmonics, for example, second harmonic generation (SHG) and parametric conversion of optical frequency by the interaction of laser beams in non-linear dielectric materials is generally well known. Illustrative of various techniques and/or non-linear dielectric materials for parametric conversion of optical laser beams include U.S. Pat. Nos. 3,262,058; 3,506,843; 3,528,765; and 3,530,301.

Generally, the conversion from the fundamental frequency to a second harmonic beam or parametrically generated beam can be obtained by using a non-linear, bifringent crystalline material such as lithium methaniobate, potassium dihydrogen phosphate (KDP), barium sodium niobate ($Ba_2NaNb_5O_{15}$), and the like. Parametric generation takes place by virtue of the fact that these dielectric crystals do not possess a center of symmetry, and the fundamental beam, if intense enough, generates a polarization of the material which is proportional to the square of the electric field associated with the beam. In the simplest case, the frequency of the parametrically generated beam is twice the frequency of the fundamental beam in which case is called second harmonic generation.

It is well known that for efficient optical frequency conversion, it is necessary to maintain well-defined phase relations between the fundamental beam and the parametrically generated beam in the non-linear crystal. The normal dispersion of refractive index, $n$, in the non-linear material means that the velocity of the fundamental beam is different from that of the second harmonic which results in dephasing as the beams travel through the crystal. This dephasing may be eliminated by taking advantage of birefringence of the crystal, for example, by propagating the fundamental and second harmonic beams in a common direction $\theta$ in the crystal such as the fundamental propagates as an ordinary ray while the second harmonic beam propagates as an extraordinary ray. This technique, however, is limited because the energy propagation vectors of the two beams generally diverge from each other putting a limit on the conversion efficiency which can be obtained with a crystal of a given length. This problem can be eliminated in certain crystals by propagating the beams at 90° with respect to crystal C-axis, and taking advantage of temperature dependence of the refractive indices. Thus, for example, in parametric oscillators and second harmonic generation in $LiNbO_3$ and $Ba_2NaNb_5O_{15}$ the output frequencies of the crystal can be varied by varying the temperature, while the angular relationship between wave and optic axis remains 90°, to thereby assure a high interaction efficiency.

It has been appreciated that the temperature dependence of birefringence in such non-linear crystals as lithium niobate, barium sodium niobate, and the like make it possible to obtain a high efficiency oscillator. It has been thought, however, that the use of temperature as a controlling parameter introduces certain problems or drawbacks that generally typify temperature controlled arrangements. For example, the frequency variations through temperature control is a slow process, and hence such arrangements were not deemed useful as modulators. In addition, for a fixed frequency output, such arrangements were not believed to be completely stable, because of the slowness or time lag inherent in thermostat systems for maintaining a constant temperature and hence a constant frequency output. Accordingly, other methods were used to achieve control over phase-matching conditions in the crystal, see, for example, U.S. Pat. No. 3,328,723. In that method, an electric field is used to control phase-matching conditions in the system. The electric field control is used to stabilize only the frequency of light coming out of the parametric oscillator, but is not used to control the total output power except in that it provides optimum phase-matching for a given frequency. Since the effect due to temperature variations is generally much greater than effect due to electric field, the stabilization achieved is limited.

Accordingly, it is an object of the present invention to provide a means and method for controlling the phase-match of a non-linear crystal by utilization of temperature control. It is a further object of the present invention to obtain a stable, optimized parametric output beam by continuously adjusting the temperature of the non-linear crystal in response to variations in parametric output power.

SUMMARY OF THE INVENTION

In a non-linear crystal, the fundamental wave propagates at a refractive index $N_o(\omega,\theta)$ while the parametric beam propagates at a refractive index equal to $N_E(\omega',\theta)$ where $\omega'$ is the parametric frequency and where $\theta$ is chosen so that $N_o(\omega, \theta)$, equal $N_E(\omega',\theta)$. Since the refractive indices are temperature dependent, the non-linear crystal temperature must be regulated to some value $T_{PM}$ so that $N_o(\omega,T_{PM})$ equal $N_E(\omega',T_{PM})$, where $T_{PM}$ is the optimum crystal phase-match temperature.

It has been found that the desired phase-match temperature, $T_{PM}$, is not the same in all regions of the crystal due to minor variations in crystal properties. $T_{PM}$ is generally a function of: (1) the shape of the fundamental beam in the crystal, (2) the amount of second harmonic power coupled out of the laser cavity in the case of internal second harmonic generation, and (3) temperature gradients within the crystal itself created by heat absorption from the beam where very high power densities exist in the non-linear crystals. Accordingly, the optimum phase-matched temperature, $T_{PM}$, is dependent on the operating conditions. Thus, the present invention provides a method for obtaining and maintaining an optimum crystal temperature which is predicated upon the variables of the system and constantly varies during the course of parametric generation.

Generally, therefore, the present invention provides a method in which the intensity of at least a portion of the parametrically generated output beam is continuously measured to produce an output signal which is proportional to the measured intensity. Preferably, the output is a digital signal in the form of pulses in which the pulse rate is proportional to the intensity of the beam.

The pulse rate during first and second periods $\tau_1/2$ and $\tau_2/2$ of each consecutive sample period $\tau$ is compared and any difference between the number of pulses $N_1$ during the first period and the number $N_2$ occurring during the second period is used to control the temperature of the non-linear crystal.

Preferably the temperature is continually varying such that where $N_1-N_2<0$ the temperature is changed to increase the parametric output power and where $N_1-N_2>0$ the temperature is reversed to increase the output power.

The output power, for example, of a 0.53 $\mu$ second harmonic, is not generally measurable until the temperature approaches to within about 5°C of $T_{PM}$. Therefore, it is generally desirable to take the nonlinear crystal to within that range prior to utilizing the present method to expedite optimization.

In one embodiment of the invention, the parametrically generated output beam is sampled by a beam splitter. The split beam sample is preferably filtered to eliminate undesired frequency components and directed to a photomultiplier. The photomultiplier output is fed to an analog-to-digital converter to obtain a digital output signal. The pulse rate of the output signal is proportional to the photomultiplier signal.

A similar signal can be obtained by means of a photomultiplier tube used as a photon counter. In either case, the output pulses are fed to a multivibrator having a total sample period $\tau$ and first and second channels open for $\tau_1/2$ and $\tau_2/2$, respectively. The first and second channels of the multivibrator are electrically connected to a bidirectional counter.

The bidirectional counter is selected to provide an output pulse that is either equal or proportional to any differences in the number of pulses counted from the first and second channels of the multivibrator. A stepping motor is preferably used to control the potentiometer of the temperature control circuit of the heater means of the non-linear crystal. The stepping motor includes a logic circuit for controlling rotation of the motor.

The logic circuit is designed to continue rotation of the stepping motor if the number of pulses ($N_1$) from the first channel is less than the number ($N_2$) counted from the second channel of the multivibrator; i.e., $N_1-N_2<0$. If, however, $N_1-N_2>0$, the logic circuit reverses the motor since this indicates a decrease in output power.

Other advantages of the present invention will become apparent from a perusal of the following detailed description of a presently preferred embodiment taken in connection with the accompanying drawings.

PRESENTLY PREFERRED EMBODIMENT

Figure 1:
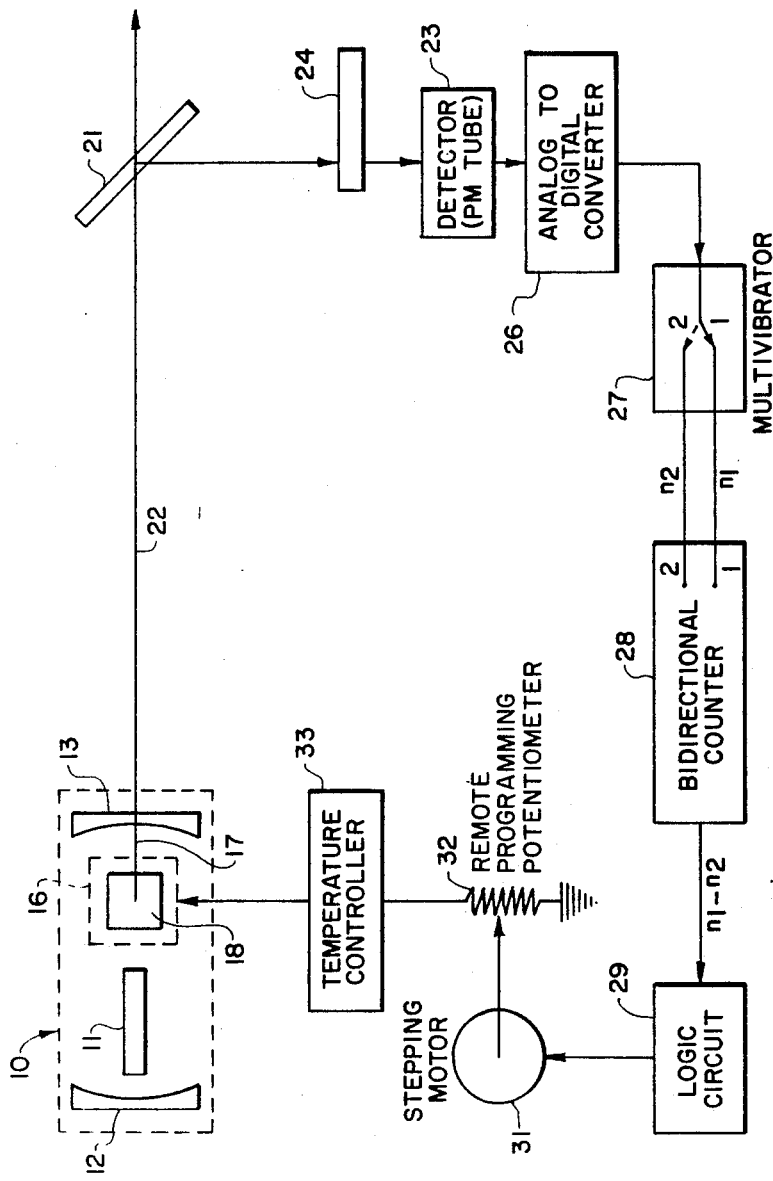
FIG. 1 is a block diagram of a second harmonic generation (SHG) system incorporating the automatic stabilizing and optimizing means of the present invention.

With reference to FIG. 1, a laser cavity 10 includes a pumped laser rod 11, for example, an Nd:YAG laser rod which provides a 1.06 $\mu$ wavelength output when lasing. While particular reference is made to a Nd:YAG laser system, it is clear that other systems are also adapted for parametric generation.

Laser cavity 10 also includes a pair of reasonator mirrors 12 and 13 having maximum reflectivity at the fundamental frequency of laser rod 11. Resonator 13, however, is partially transparent to the selected parametric frequency.

For example, in the present embodiment, resonator 13 is about 90 percent transparent to the second harmonic, 0.53 $\mu$, wavelength and resonator 12 is 100 percent reflective to the second harmonic wavelength in addition to the fundamental. Where, however, the non-linear crystal is positioned externally of the laser cavity, resonator 13 is about 98 percent reflective at the fundamental frequency.

Positioned along optical axis 17 of laser cavity 10 is oven 16. Oven 16 is preferably a cylindrical resistance oven capable of permitting circulation therethrough of the fundamental beam without substantial loss of heat therefrom or power loss from the beam.

In the present case, non-linear crystal 18 is positioned within oven 16. For generation of second harmonics, 0.53 $\mu$ wavelength, $Ba_2NaNb_5O_{15}$ non-linear crystal is preferred. Crystal 18 is positioned so that its C-axis is perpendicular to optical axis 17 of cavity 10.

Because resonators 12 and 13 in the present case have maximum reflectivity with respect to the fundamental wavelength, the 1.06 $\mu$ circulating power density in cavity 10 is very high. The efficiency of the conversion of 1.06 $\mu$ power to 0.53 $\mu$ power depends on the phase-matching conditions in non-linear crystal 18.

The power of the second harmonic frequency /P $^{2\omega}$ is proportional to $$\frac{\sin^2\left(\frac{\Delta k}{2}L\right)}{\left(\frac{\Delta k}{2}L\right)2},$$

where $k$ is the wave vector ($\Delta k = 4\pi/\lambda\,[N_E(2\omega,T) - N_o(\omega,T)]$) and L is the length of crystal 18. Then maximum power is where $$N_E(2\omega,T_{PM}) = N_o(\omega,T_{PM}).$$

Figure 2:
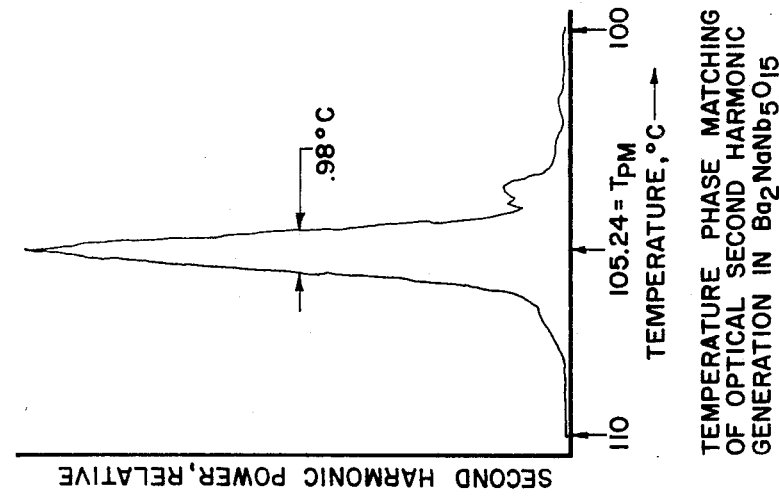
FIG. 2 is a graphical representation of the second harmonic output response of a $Ba_2NaNb_5O_{15}$ crystal as a function of temperature.

Referring to FIG. 2, a graphical representation of the relative second harmonic power (0.53 $\mu$) as a function of temperature in $Ba_2NaNb_5O_{15}$. The fundamental beam was generated by a free-running continuouos wave multimode Nd:YAG laser. The laser was operated at about 2 watts and the beam was focused with a 6.2 cm. focal length lens. The non-linear crystal was positioned external to the laser cavity as opposed to internal as shown in FIG. 1. As can be seen from FIG. 2, $T_{PM}$ was equal to about 105.24°C.

Since the phase-match temperature is not the same in all regions of crystal 18 due to variations in the crystal properties, $T_{PM}$ is, thus, a function of (i) the shape of the fundamental beam in crystal 18, (ii) the amount of parametric beam power coupled out of the laser cavity and (iii) temperature gradients within the crystal caused by absorption of the fundamental and parametric beam at high power densities as in the system herein described.

Accordingly, the present invention varies the temperature of resistance oven 16, and thus crystal 18, in continuous response to variations in the parametric output beam. Positioned along the optical axis of the parametric output beam is beam splitter 21 for sampling a portion of the output beam. Along the axis of sampled beam 22 is positioned a detector 23, for example, a direct current photomultiplier tube. Preferably a filter means 24 is positioned between beam splitter 21 and detector 23 to eliminate all wavelengths except the desired parametric wavelength, in this case 0.53 $\mu$.

The output of detector 23 is electrically connected to analog-to-digital converter 26 to provide a pulsed output. Thus, the output pulse rate of converter 26 is proportional, at any given instant, to the output signal of detector 23.

If detector 23 is a photocounter, for example which provides a digital output, converter 26 can be eliminated. However, it is preferable in such cases to use a pulse height discriminator to improve the signal-to-noise ratio.

Converter 26 is electrically connected to multivibrator 27 having first and second output channels and a total period t. The output pulses from converter 26 are continuously fed to multivibrator 27 and during each consecutive period $\tau$, multivibrator 27 during the first half period $\tau_1/2$ directs pulses $N_1$ to the first output channel and during the second half perioid $\tau_2/2$ directs pulses $N_2$ to the second output channel. The first and second output channels of multivibrator 27 are electrically connected to first and second inputs of bidirectional counter 28.

Bidirectional counter 28 preferably is capable of operating in A,B and A-B modes or +A, −A modes. A four decade counter suitable for use in the present invention is an Atek model 2,400. Thus, bidirectional counter 28 is provided an output pulse equal or proportional to any difference in the number of pulses $(N_1-N_2)$ counted from the first and second channels.

Bidirectional counter 28 is electrically connected to the logic control circuit 29 of stepping motor 31. Stepping motor 31 is mechanically connected to the remote programming potentiometer 32 of temperature controller 33. Temperature controller 33 provides control over the current used for electrical resistance heater in oven 16. Any standard potentiometric slide wire control is suitable and will additionally provide a record of the temperature vs. time.

Logic circuit 29 maintains the direction of rotation of motor 31 if $N_1-N_2<0$, i.e., where the power monitored during the first half of period $\tau$ is less than that during the second half, the temperature is moving in a direction of increased power. However, if the $N_1-N_2>0$, the temperature is moving in the direction of decreased power, and logic circuit 29, therefore, reverses the direction of stepping motor 31 in that case. Where $N_1-N_2=0$, logic circuit 29 holds motor 31.

Thus, the present invention provides both a means and a method for automatically adjusting the crystal temperature to provide a stable, maximum parametric output regardless of any changes in any other of the systems parameters. Moreover, since the accuracy of the system depends upon the difference between two counts, the degree of accuracy can be adjusted by adjusting the period T or the analog-to-digital conversion rate.

It is also clear, that other means may be advantageously utilized to carry out the present invention. For example, a single channel bidirectional counter having the capability to add or subtract could be used. Multivibrator 27 would be used to change the direction of the count, for example, in a first position it counts up and in a second position it counts down. At the end of period T any difference is of the correct sign and magnitude. Also a multivibrator synchronous with the input to bidirectional counter 28 can be included in the circuit between the counter and logic circuit 29 of stepping motor 31 to reset the counter to zero.

Accordingly, while present preferred embodiments of the invention have been shown and described in particularity, it may be otherwise embodied within the scope of the appended claims.

What is claimed is:

1. In a method for generating an optical parametric beam in which the temperature of a nonlinear crystal can be varied in first and second opposite directions to increase the power output of said beam; the improvement comprising
    A. continuously measuring the intensity of at least a portion of said beam to generate pulse signals having a rate at least proportional to the measured intensity;
    B. continuously sampling said pulse signals during consecutive first and second periods;
    C. counting the number of pulse signals measured during each first and second period and comparing said numbers;
    D. adjusting the temperature in direct response to any difference in the number of pulse signals counted during said first and second periods; and
    E. repeating steps C and D for each sampling period.

2. In a method as set forth in claim 1 including continually adjusting the temperature in a first direction where the number counted during the second period is greater than the number counted during the first period, reversing the direction to said second direction where said first number of pulse signals is greater than said second number, and discontinuing any adjustment where said number of pulse signals during said first and second periods is equal.

3. In a system for generating an optical parametric output beam including a nonlinear crystal having means for varying the temperature of said crystal, the improvement comprising:
    A. means for measuring the intensity of at least a portion of said output beam to provide an output signal proportional to the measured intensity;
    B. means electrically connected to said measuring means for comparing the output signals between first and second periods;
    C. logic means for producing control signals proportional to any difference in compared output signals and electrically connected to said means for comparing signals; and
    D. drive means electrically connected to said logic means and having an output operably connected to said means for varying said crystal temperature, said drive means being responsive to said control signals for controlling said temperature means.

4. The improvement as set forth in claim 3 wherein said measuring means includes means for splitting said parametrically generated output beam into a sample beam and a main beam and a photon counter positioned to receive said sample beam.

5. The improvement as set forth in claim 3 wherein said means for comparing output signals includes a multivibrator for dividing consecutive sampling periods into first and second periods and a bidirectional counter for counting output signals during said first and second periods.

6. The improvement set forth in claim 3 wherein said drive means comprises a stepping motor connected to a remote programming potentiometer, said potentiometer being electrically connected to said means for varying the temperature of said crystal.

7. The improvement set forth in claim 3 wherein said measuring means includes a means for splitting said parametric output beam into a sample beam and a main beam, a photomultiplier positioned to receive said sample beam, and an analog-to-digital converter electrically connected to said photomultiplier for providing output pulses proportional to the intensity of said sampled beam.

8. In a system for generating an optical parametric output beam including a nonlinear crystal having means for varying the temperature of said crystal, the improvement comprising:
  A. means for splitting said parametric output beam into a sample beam and a main beam;
  B. detector means positioned to receive said sample beam and generate a pulse output signal having a pulse rate at least proportional to the intensity of said sample beam;
  C. sampling means electrically connected to the output of said detector means and having first and second output channels, each of said channels being open for first and second periods of consecutive sample periods;
  D. a counter means having first and second inputs electrically connected to the first and second outputs of said sampling means for counting the number of pulses during said first and second periods to provide an output control signal proportional to any difference between the number of pulses counted between said first and second periods;
  E. control means coupled to said means for varying the temperature of said crystal and including a stepping motor and potentiometer controlled by said motor and a logic circuit electrically connected to said counter means and to said stepping motor for controlling rotation of said motor in proportion and direction to said control signal.

9. The improvement claimed in claim 8 wherein said detector means is a photomultiplier and including an analog-to-digital converter electrically connected to said photomultiplier to convert signals therefrom to digital pulse form.

10. The improvement set forth in claim 9 wherein said sampling means is a multivibrator electrically connected to said analog-to-digital converter.

* * * * *